United States Patent
Kreider

[11] Patent Number: 6,037,645
[45] Date of Patent: Mar. 14, 2000

[54] TEMPERATURE CALIBRATION WAFER FOR RAPID THERMAL PROCESSING USING THIN-FILM THERMOCOUPLES

[75] Inventor: Kenneth G. Kreider, Potomac, Md.

[73] Assignee: The United States of America as represented by the United States Department of Commerce, Washington, D.C.

[21] Appl. No.: 09/016,668

[22] Filed: Jan. 27, 1998

[51] Int. Cl.[7] .................................................. H01L 31/00
[52] U.S. Cl. ............................................ 257/467; 257/469
[58] Field of Search .................................. 257/467, 469

[56] References Cited

U.S. PATENT DOCUMENTS

| | | | |
|---|---|---|---|
| 4,456,919 | 6/1984 | Tomita | 257/467 |
| 4,571,608 | 2/1986 | Johnson | 257/467 |
| 5,033,866 | 7/1991 | Kehl et al. . | |
| 5,374,123 | 12/1994 | Bu | 257/467 |
| 5,411,600 | 5/1995 | Rimai et al. . | |
| 5,436,494 | 7/1995 | Moslehi . | |
| 5,474,619 | 12/1995 | Krieder . | |

OTHER PUBLICATIONS

"High Temperature Silicide Thin–Film" by Kenneth G. Krieder, pp. 285–290, Mat. Res. Soc. Symp. Proc. vol. 322, 1994 Materials Research Society.

SensArray Corporation, Using SensArray Temperature Instrumented Wafers, Series 1501, Type K Thermocouples Temperature Range 0° C. to 1100° C., 1501–K User Guide, Feb. 5, 1994, pp. 1–2.

Primary Examiner—Jerome Jackson, Jr.
Attorney, Agent, or Firm—Larson and Taylor

[57] ABSTRACT

A thin-film thermocouple is provided which can be used at temperature of up to 900° C. The thin-film thermocouple includes: a silicon substrate; an $SiO_2$ diffusion barrier layer formed on the substrate; a titanium oxide adhesion layer formed on the diffusion barrier layer; a palladium thin film formed on the diffusion barrier layer; and a platinum thin film formed on the diffusion barrier layer and overlapping a portion of the palladium thin film to form a thermocouple junction.

17 Claims, 1 Drawing Sheet

TEMPERATURE CALIBRATION WAFER FOR RAPID THERMAL PROCESSING USING THIN-FILM THERMOCOUPLES

BACKGROUND OF THE INVENTION

1. Field of the Invention

The present invention relates to devices used to measure temperatures in rapid thermal processing tools for silicon wafer processing and, more particularly, to a thin-film thermocouple calibration wafer for calibrating pyrometric temperatures.

2. Related Art

Rapid thermal processing (RTP) technology is becoming more widely used in the fabrication of semiconductor integrated circuits because of its ability to obtain smaller feature sizes on semiconductor chips, its reduced development and production times, and its adaptability to changes in wafer size and design. In particular, RTP technology is used in processes including dopant anneal, polysilicon deposition, and chemical vapor deposition of metals, silicides and nitrides. However, RTP tools require more stringent temperature control than other semiconductor fabrication devices. Conventional calibration wafers with wire thermocouples have demonstrated poorly defined effects on the heat transfer to the wafer during the calibration procedure and lack the accuracy required. The insulation layer between the wafer and the wires and the conductivity of the wires disturb the heat transfer pattern leading to uncertainties in the temperature measurement.

Thin-film thermocouples have been used in applications where wire thermocouples are not suitable. However, the use of thin-film thermocouples at elevated temperatures has been limited because the reactivity of thin-film thermocouples is more of a problem than with conventional wire thermocouples. Reactivity is more of a problem because of the very short diffusion distances present in thin-films. For example, what might be considered a small surface reaction on a wire can consume a 1 $\mu$m thick film. The chemical reactions of the thin-films lead to a change in the Seebeck coefficient. The problem of reactivity increases at high temperatures, such as those encountered in RTP tools for silicon wafer processing. RTP tools reach temperatures up to 900° C. Thin-film thermocouples have not been used with RTP technology because of the reactivity problem with silicon wafers and other reasons.

Therefore, there exists a need in the art for a thin-film thermocouple which can be used on silicon wafers at temperatures of up to 900° C.

SUMMARY OF THE INVENTION

In accordance with the invention, a thin-film thermocouple or thermocouple array is provided which, among other advantages, can be used at temperature of up to 900° C. The thin-film thermocouple includes: a substrate; a diffusion barrier layer formed on the substrate; an adhesion layer formed on the diffusion barrier layer; a first thin-film noble metal formed on the diffusion barrier layer; and a second thin-film noble metal formed on the diffusion barrier layer and overlapping a portion of the first thin-film noble metal to form a thermocouple junction.

In a preferred embodiment, the substrate comprises a silicon wafer.

In an advantageous implementation, one of the first and second thin-film noble metals comprises palladium and the other of the first and second thin-film noble metals comprises platinum. In another advantageous implementation, one of the first and second thin-film noble metals comprises rhodium and the other of the first and second thin-film noble metals comprises iridium.

Preferably, the thin-film thermocouple further includes a protective film formed over the palladium thin-film. The protective film preferably comprises aluminum oxide.

The diffusion barrier layer preferably comprises an insulating layer. Advantageously, the diffusion barrier layer comprises $SiO_2$.

The adhesion layer preferably comprises titanium and titanium oxide.

Preferably, the first and second thin-film noble metals are each formed as a plurality of line segments, the first thin-film line segments overlap portions of the second thin-film line segments to form a plurality of thermocouple junctions arranged with a radial distribution and azimuthal redundancy above the substrate. The preferred arrangement includes thermocouple junctions formed at different distances from the center of the substrate; and thermocouple junctions formed on different areas of the substrate and at the same distance from the center of the substrate.

Other features and advantages of the invention will be set forth in, or apparent from, the following detailed description of the preferred embodiments of the invention

DESCRIPTION OF THE PREFERRED EMBODIMENTS

Figure 1:
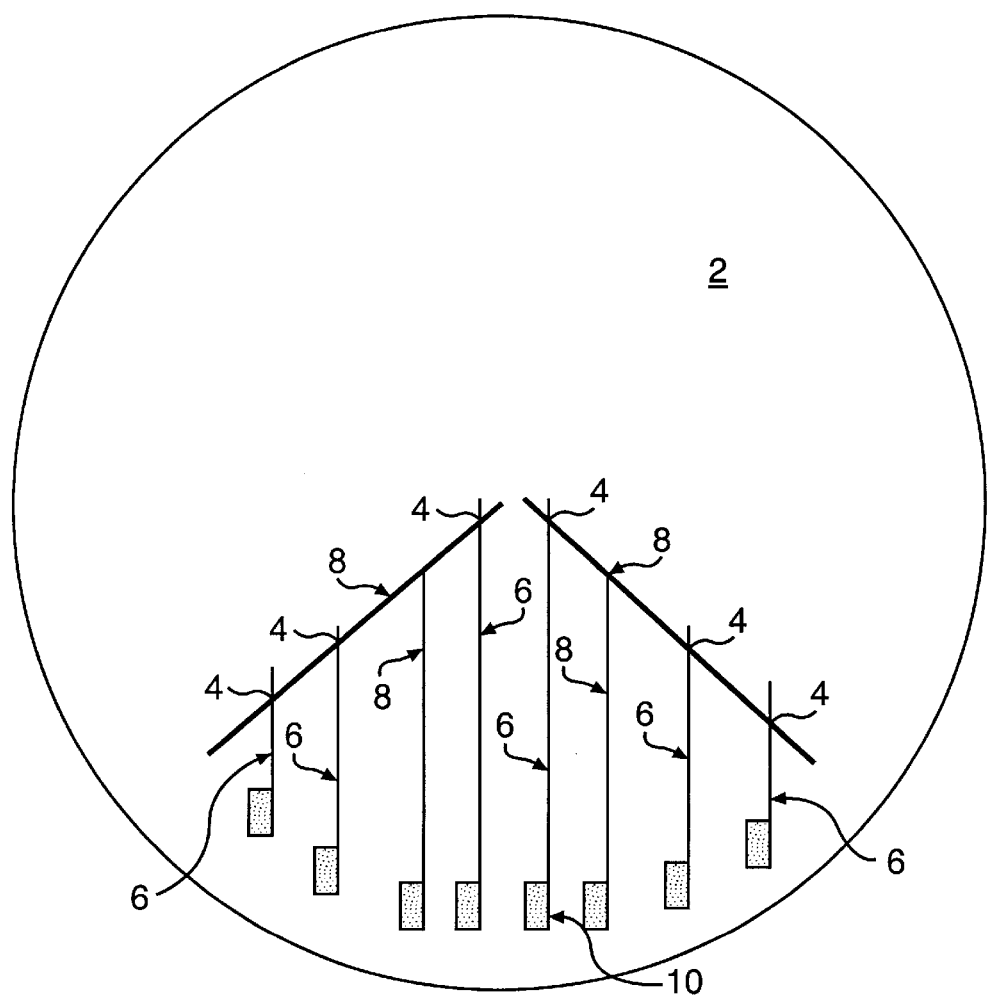
FIG. 1 is a schematic top plan view of a temperature calibration wafer in accordance with a preferred embodiment of the invention.

A preferred embodiment of the calibration wafer of the invention is shown in FIG. 1. In this embodiment, thin-film thermocouple junctions 4 are formed on a silicon wafer substrate 2. The pattern of the thermocouple junctions 4 is selected to yield a radial distribution of temperatures and azimuthal redundancy. The radial distribution is obtained by forming the thermocouple junctions 4 at different distances from the center of the substrate 2. The azimuthal distribution is obtained by forming the thermocouple junctions 4 on different areas the substrate 2, but at the same distance from the center of the substrate 2.

The silicon wafer substrate 2 is preferably a standard 200 mm single crystal substrate. The thermocouple junctions 4 are formed by intersecting metal thin-film lines 6 and metal thin-film lines 8. The alternating vertical lines 6 and 8 (as viewed in FIG. 1) have terminal contact portions 10. Thermocouple wires (not shown) of the same composition as the thin-film lines 6 and 8 are welded to the thin films 6 and 8 at the contact portions 10 and may be connected to a monitoring device (not shown).

Figure 2:
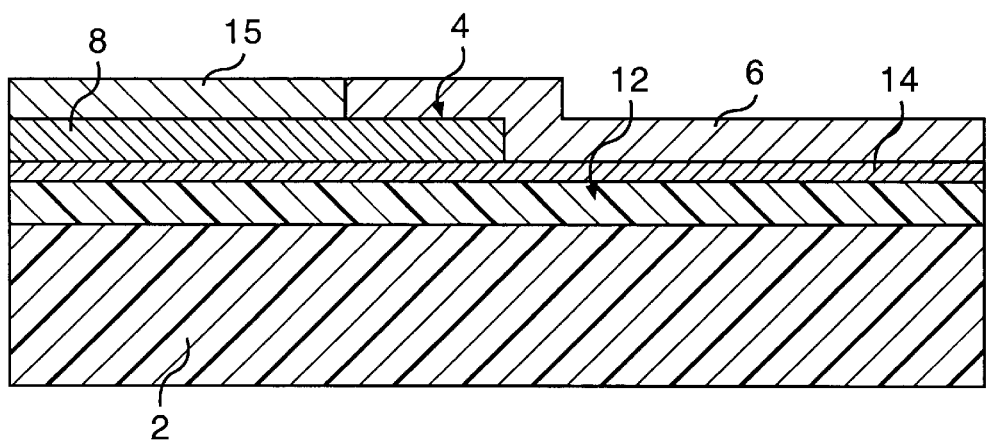
FIG. 2 is a cross sectional view of the temperature calibration wafer shown in FIG. 1.

FIG. 2 shows a cross-sectional view of the calibration wafer shown in FIG. 1. A diffusion barrier layer 12 is formed directly above the substrate 2. The diffusion barrier layer 12 is preferably a 300–400 nm thick thermal oxide of silicon, $SiO_2$, grown by methods well known in the art. The diffusion barrier layer 12 also functions as a dielectric insulating layer.

An adhesion layer 14 is formed on the diffusion barrier layer 12, since $SiO_2$ does not bond well to noble metals at elevated temperatures. A preferred adhesion layer 14 is titanium/titanium oxide. A 2–6 nm layer of titanium is deposited on the diffusion barrier layer 12 which is subsequently partially oxidized during further processing at elevated temperatures to form the titanium oxide adhesion layer 14. This high temperature anneal of the assembly including the noble metal thin-film lines 6 and 8 stabilizes the structure and the Seebeck coefficient of the thermocouples. Another advantage of this method is that very small amounts of titanium from the adhesion layer 14 dissolve into the later formed thin-film lines 6 and 8. Stable thin-film lines 6 and 8 result in a stable and predictable Seebeck coefficient. Without the diffusion barrier layer 12 and the adhesion layer 14, silicides of the thin film lines 6 and 8 would form at elevated temperatures and change the Seebeck coefficient.

In a preferred embodiment, platinum thin-film lines 6 and palladium thin-film lines 8 are formed above the adhesion layer 14 with a thickness of 500–1000 nm. However, other thermoelectric thin-films may be used on a silicon substrate, such as rhodium or iridium or those containing silicides or nitrides. Conventional thermocouple materials such tungsten/rhenium, nickel-copper/nickel alloy and platinum/rhodium may also be formed into thin-film lines and used in the present invention. Very low mass thin-film thermocouples are preferred when making measurements under extremely high heat flux conditions present in RTP tools, which can be as high as 100 W/cm$^2$. In the preferred embodiment, the thin-films are deposited sequentially in a 99.999% argon atmosphere by sputtering 99.995% pure palladium and 99.999% pure platinum. The sputtering chamber is pumped down to a pressure of $10^{-4}$ Pa with primarily H$_2$O as the residual gas prior to introducing the argon. The shapes of the platinum thin-film lines 6 and the palladium thin-film lines 8 are obtained by using conventional photolithography techniques. Although in FIG. 1, the palladium lines 8 are shown as being wider than the platinum lines 6, this is for illustration purposes only.

Test results demonstrate that platinum and palladium thin-films are well suited for use in thermocouples. When compared to the output of a pure thermocouple grade platinum wire, a platinum thin-film drifted in output by less than 2° C. after 24 hours exposure in air at 860° C. The hysteresis and repeatability of the platinum thin film was also found to be within 1° C. Palladium thin-films formed on silicon substrates were found to have similar characteristics. When compared to the output of a thermocouple grade platinum wire, the output of the palladium thin-film was within 2° C. at 900° C. The hysteresis and repeatability of the palladium thin-film was found to be within 2° C. The thin-film thermocouples made in accordance with the invention were found to reduce uncertainties in temperature measurements by a factor of five or more when compared to conventional wire thermocouples. Furthermore, the thin-film thermocouples were found to be stable for up to 8 hours at 850° C.

As noted above, in FIG. 2, thermocouple junctions 4 are formed where the platinum thin-film lines 6 overlaps the palladium thin-film lines 8. In order to prevent oxidation, an oxide film 15 is preferably deposited over the palladium thin-film 8. The preferred oxide film 15 is aluminum oxide and may be applied by sputtering or any other conventional deposition method and preferably has a thickness of 500 nm. An oxide film (not shown) may also be formed over the thin-film lines 6, if the material used is susceptible to corrosion.

The thermocouple junctions 4 operate in the conventional manner. When two dissimilar metals are placed in contact, they generate a Seebeck voltage which is a function of their temperature. An increase in the temperature causes an increase in the voltage. The thermocouple wires (not shown) are connected to a conventional monitoring device (not shown) which converts the Seebeck voltage into a temperature readout.

Although the invention has been described in detail with respect to preferred embodiments thereof, it will be apparent to those skilled in the art that variations and modifications can be effected in these embodiments without departing from the spirit and scope of the invention.

I claim:

1. A calibration wafer for use in rapid thermal processing, said calibration wafer comprising:
   a silicon wafer substrate;
   a diffusion barrier layer formed on said substrate;
   an adhesion layer formed on said diffusion barrier layer;
   a first thin-film noble metal formed on said diffusion barrier layer; and
   a second thin-film noble metal formed on said diffusion barrier layer and overlapping a portion of said first thin-film noble metal to form a thermocouple junction.

2. The thin-film thermocouple according to claim 1, wherein one of said first and said second thin-film noble metals comprises palladium and the other of said first and said second thin-film noble metals comprises platinum.

3. The thin-film thermocouple according to claim 2, further including a protective film formed over said palladium thin-film.

4. The thin-film thermocouple according to claim 3, wherein said protective film comprises aluminum oxide.

5. The thin-film thermocouple according to claim 4, wherein said diffusion barrier layer comprises an insulating layer.

6. The thin-film thermocouple according to claim 5, wherein said diffusion barrier layer comprises SiO$_2$.

7. The thin-film thermocouple according to claim 6, wherein said adhesion layer comprises titanium oxide.

8. An array of thin-film thermocouples comprising:
   a substrate;
   a diffusion barrier layer formed on said substrate;
   an adhesion layer formed on said diffusion barrier layer;
   a plurality of first thin-film noble metal line segments formed on said diffusion barrier layer in a first pattern; and
   a plurality of second thin-film noble metal line segments formed on said diffusion barrier layer in a second pattern such that portions of said first thin-film line segments overlap portions of said second thin-film line segments to form a plurality of thermocouple junctions arranged with a radial distribution and azimuthal redundancy above said substrate.

9. The array of thin-film thermocouples according to claim 8, wherein said substrate comprises a silicon wafer.

10. The array of thin-film thermocouples according to claim 9, wherein one of said first and said second thin-film noble metals comprises palladium and the other of said first and said second thin-film noble metals comprises platinum.

11. The array of thin-film thermocouples according to claim 10, further including a protective film formed over said palladium thin-film line segments.

12. The array of thin-film thermocouples according to claim 11, wherein said protective film comprises aluminum oxide.

13. The array of thin-film thermocouples according to claim 12, wherein said diffusion barrier layer comprises an insulating layer.

14. The array of thin-film thermocouples according to claim 13, wherein said diffusion barrier layer comprises $SiO_2$.

15. The array of thin-film thermocouples according to claim 14, wherein said adhesion layer comprises titanium oxide.

16. The array of thin-film thermocouples according to claim 8, wherein said plurality of thermocouple junctions comprises:

thermocouple junctions formed at different distances from the center of said substrate; and thermocouple junctions formed on different areas of said substrate and at the same distance from the center of said substrate.

17. The array of thin-film thermocouples according to claim 8, wherein one of said first and said second thin-film noble metals comprises rhodium and the other of said first and said second thin-film noble metals comprises iridium.

* * * * *